United States Patent [19]
Whitney et al.

[11] Patent Number: 5,484,300
[45] Date of Patent: Jan. 16, 1996

[54] PRE-BUSSED RIGID CONDUIT

[75] Inventors: Robert I. Whitney, Brookville, Ind.; Lisa C. Simmering, Fair Play, S.C.; Glenn S. O'Nan, Hamilton, Ohio; Aubrey Bryant, Liberty, Ind.; Steven F. Reed, Oxford, Ohio

[73] Assignee: Square D Company, Palatine, Ill.

[21] Appl. No.: 85,341

[22] Filed: Jun. 30, 1993

Related U.S. Application Data

[63] Continuation-in-part of Ser. No. 912,071, Jul. 8, 1992, Pat. No. 5,266,044.

[51] Int. Cl.$^6$ .................................................. H01R 4/60
[52] U.S. Cl. ........................................ 439/207; 439/210
[58] Field of Search .............................. 439/190–204, 439/207, 210, 271–275, 624, 654, 162–164, 115

[56] References Cited

U.S. PATENT DOCUMENTS

| | | | |
|---|---|---|---|
| 1,843,671 | 2/1932 | Gutmann et al. | 174/75 D |
| 3,005,037 | 10/1961 | Miller, Sr. | 174/49 |
| 3,871,734 | 3/1975 | Murtland | 439/276 |
| 4,154,302 | 5/1979 | Cugini | 439/271 |

*Primary Examiner*—David L. Pirlot
*Attorney, Agent, or Firm*—Larry I. Golden; David Russell Stacey; Larry Shrout

[57] ABSTRACT

A sectionalized electrical distribution feeder system for carrying electrical power from a source point to a use point or a distribution point. Each section of the distribution system includes a substantially cylindrical enclosure capable of being easily cut with a hand saw. The enclosure also provides support and protection from physical damage to a plurality of electrical conductors which are disposed within the enclosure. The conductors are held firmly in place by a number of electrically insulating supports which snugly fit inside the enclosure. Each conductor can be easily cut with a metal cutting hand saw, and is enclosed in an electrically insulating sheath which can be removed from a newly cut end to provide a contact surface. A joint connecting member is provided for electrically connecting the conductors of adjacent sections of the electrical distribution feeder system. A joint cover connects the two adjacent enclosures together and provides additional protection for the joint connecting member.

15 Claims, 17 Drawing Sheets

PRE-BUSSED RIGID CONDUIT

This application is a continuation-in-part of application Ser. No. 07/912,071, filed Jul. 8, 1992, now U.S. Pat. No. 5,266,044 included herein by reference.

FIELD OF THE INVENTION

The technical field to which this invention pertains is electrical distribution feeder systems for use in industrial and commercial locations.

BACKGROUND OF THE INVENTION

In the past, industrial and commercial electrical distribution feeder systems have generally employed cable and conduit, cable and cable tray, cable and wireway, or electrical busway. Where cable is used with conduit, the conduit must first be installed and then cables are pulled through it to complete the installation. Cable used with cable tray or wireway again involves the installation of the cable tray or wireway first and then laying of cables in the tray or wireway to complete the installation. Busway installations are generally simpler than cable and conduit or cable and tray or wireway since the conductors are already inside the protective enclosure and require no additional labor after the enclosure is installed. Busway designs of the past have generally included a number of bus bars having a rectangularly-shaped cross-section placed parallel to one another in a common plane and installed in a rectangularly shaped enclosure. The sections of busway are produced in specific lengths which can not be altered in the field during installation. For this reason, if special lengths are required they must be engineered and manufactured at the factory. This special engineering and manufacturing requires additional time for shipment to the job site and generally an increase in cost to the customer.

SUMMARY OF THE INVENTION

The present invention provides an alternative to cable and conduit, cable and tray, and busway designs for electrical feeder systems, particularly in the ampacity range of approximately 60 to 800 amperes.

In one embodiment of the present invention, an electrical feeder system includes one or more lengths of a generally cylindrical tubular enclosure which can be similar in construction to conventional metallic conduit. Disposed within the enclosure are a plurality of substantially rigid electrical conductors. End plugs are provided at each end of each length of enclosure for sealing the ends of the enclosure and supporting the conductors therein. The end plugs are made of an electrically insulating material and are dimensioned to be sealingly received within the ends of the lengths of enclosure. Longitudinal passageways are provided within the end plugs for tightly receiving each of the conductors. The passageways are spaced apart from each other and the inner wall of the enclosure to prevent physical and electrical contact between the conductors and between the conductors and the inner wall of the enclosure.

In a preferred embodiment of the present invention, longer lengths of the enclosure are provided with one or more support members disposed therein at longitudinally spaced apart locations. The support members are made of an electrically insulating material and are dimensioned to be slidably received within the enclosure. Similarly to the end plugs, the support members are provided with passageways dimensioned for tightly receiving and supporting the conductors at spaced apart locations whereby physical and electrical contact between the conductors and between the conductors and the inner wall of the enclosure is prevented.

The pre-bussed rigid conduit sectionalized electrical distribution system of the present invention is a combination of both conduit and busway. However, the system of the present invention has significant advantages over the prior art systems from which it was derived, particularly in the ampacity range of 60 to 800 amperes.

One advantage of the electrical distribution system of present invention is that the positioning of the conductors in the cylindrical enclosure permits a generally smaller and stronger enclosure than that usually employed in busway devices of the same current carrying capacity. The pre-bussed rigid conduit enclosure of the present invention is also generally smaller than that required for cable and conduit of the same current capacity.

Another advantage of the pre-bussed rigid conduit of the present invention is that it can be manufactured in specific lengths to facilitate easy handling and installation; however, unlike prior art busway systems, the pre-bussed rigid conduit of the present invention can be easily field modified with hand tools to lengths as short as 4 inches.

Yet another advantage of the present invention is that the enclosure can also provide a water resistant environment for the electrical conductors enclosed therein when assembled with standard waterproof electrical conduit fittings.

Other features and advantages of the invention will become apparent to those skilled in the art upon review of the following detailed description, claims and drawings.

BRIEF DESCRIPTION OF THE DRAWINGS

The foregoing and other objects, aspects and advantages will be better understood from the following detailed description of a preferred embodiment of the invention with reference to the drawings, in which.

Figure 1:
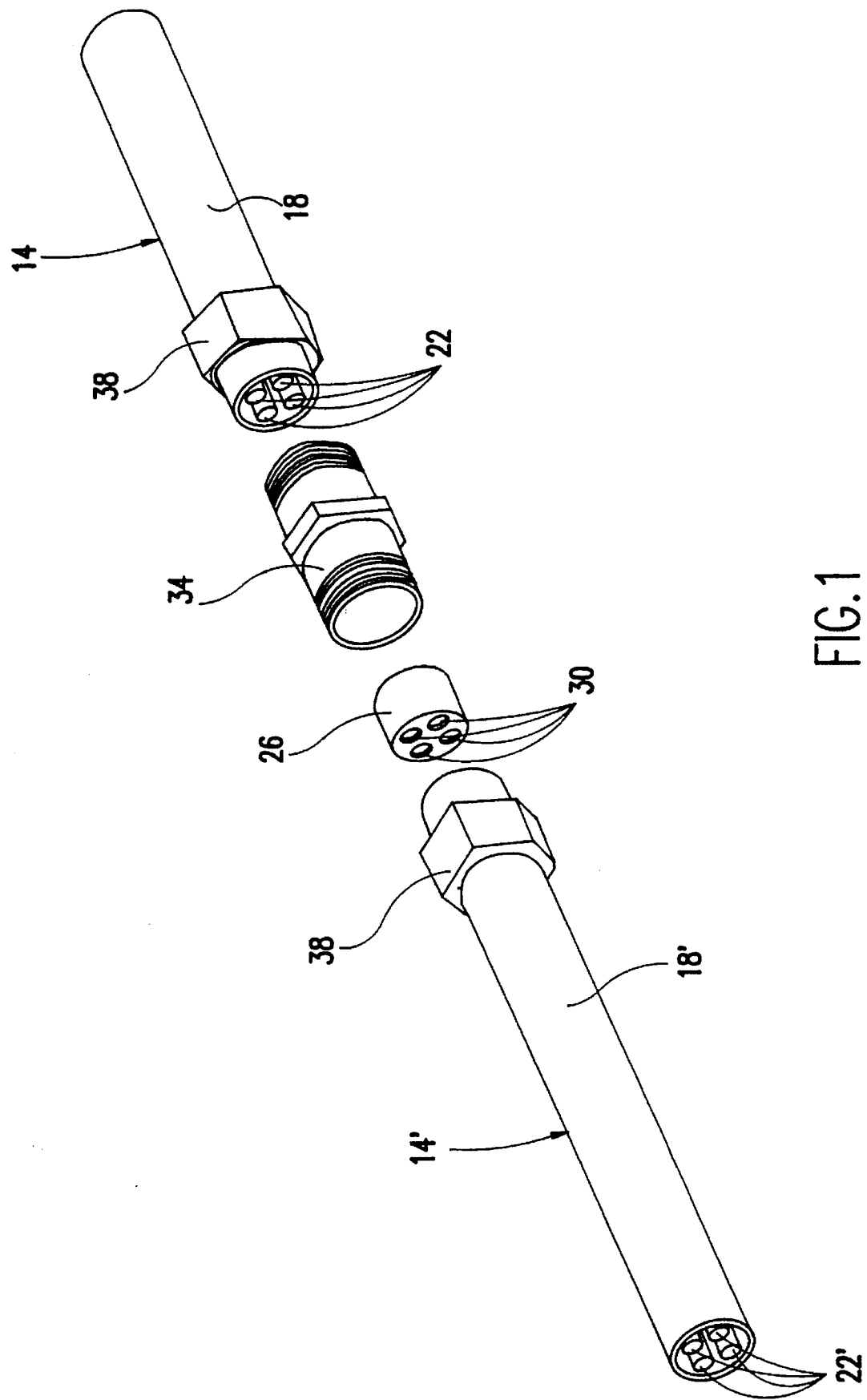
FIG. 1 is an isometric exploded view of two adjoining sections of the pre-bussed rigid conduit of the present invention.

Before one embodiment of the invention is explained in detail, it is to be understood that the invention is not limited in its application to the details of construction in the following description or illustrated in the drawings. The invention is capable of other embodiments and of being practiced or being carried out in various other ways. Also, it is to be understood that the phraseology and terminology used herein is for the purpose of description and should not be regarded as limiting.

DETAILED DESCRIPTION OF A PREFERRED EMBODIMENT OF THE INVENTION

FIG. 1 illustrates one preferred embodiment of the pre-bussed rigid conduit sectionalized electrical distribution feeder system of the present invention. A first section 14 of pre-bussed rigid conduit includes an enclosure 18 and a plurality of electrical conductors 22. A second section 14' includes an enclosure 18' and a plurality of electrical conductors 22'. A joint connecting member 26 housing a number of substantially tubular electrical connectors 30 electrically connects the conductors 22 of the first section 14 with the conductors 22' of the second section 14'. A joint cover 34 and a pair of nuts 38 physically connect the enclosure 18 of the first section 14 to the enclosure 18' of the second section 14!. In the preferred embodiment, the enclosures 18 and 18' are constructed of metal, such as conventional metallic electrical conduit, and the joint cover 34 and nuts 38 comprise conventional electrical conduit fittings.

Figure 2:
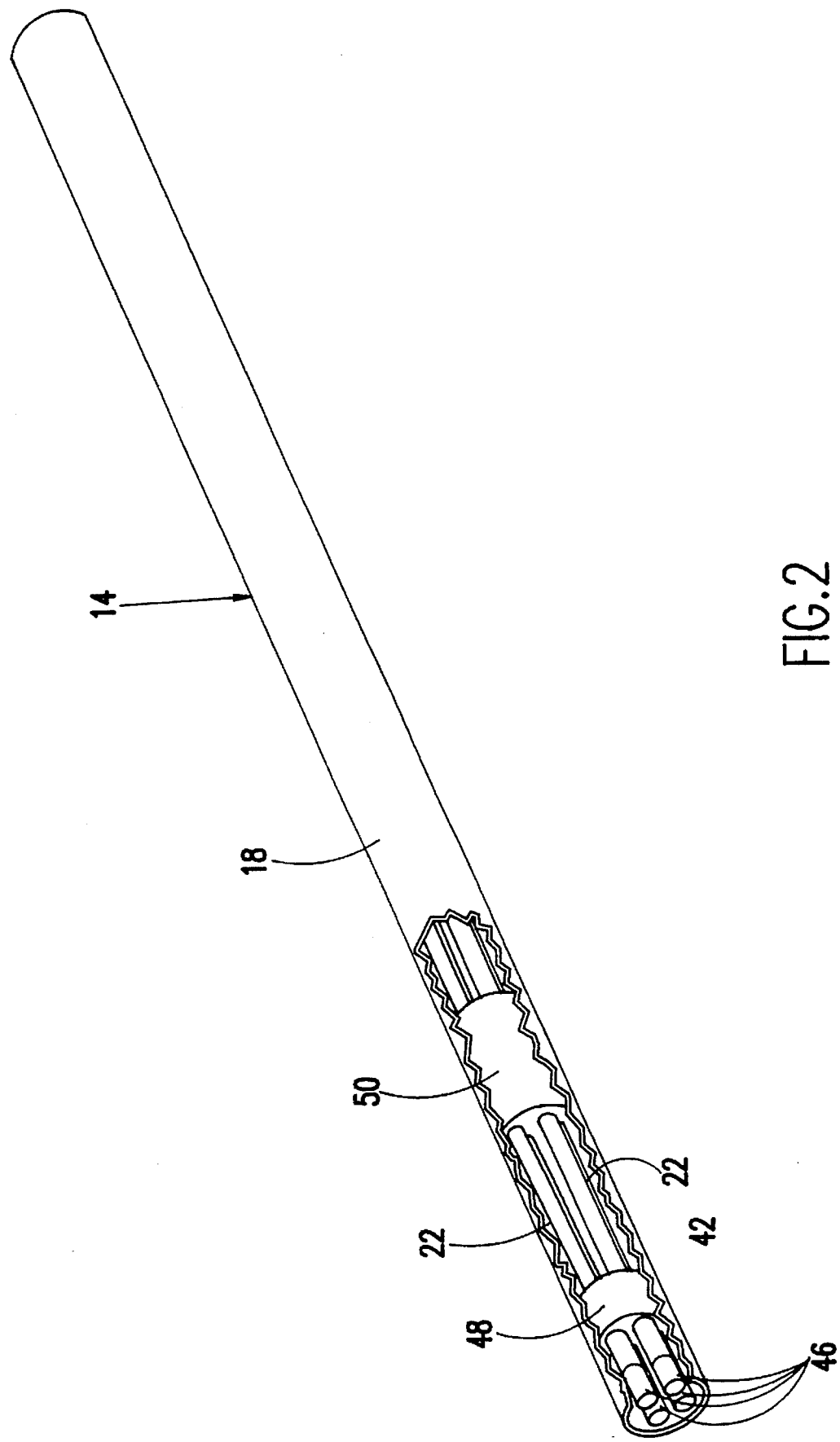
FIG. 2 is an isometric cut-away view of a section of the pre-bussed rigid conduit of the present invention.
Figure 3:
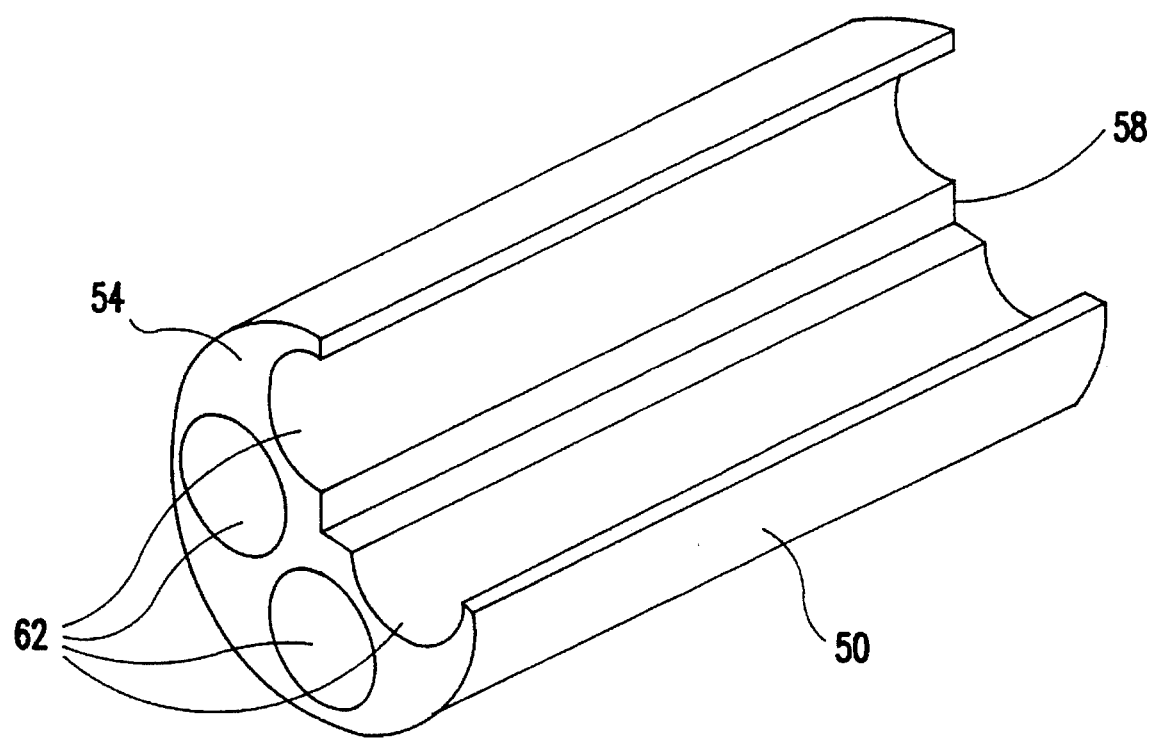
FIG. 3 is an isometric partial cross section view of an insulating support member for supporting the conductors within the enclosure of a pre-bussed rigid conduit system constructed in accordance with the present invention.

FIG. 2 illustrates the construction of a section 14 of a preferred embodiment of the pre-bussed rigid conduit of the present invention. Each conductor 22 is enclosed in an electrically insulating sheath 42. A portion of the sheath 42 is removed at each end 46 of the conductors 22 to provide an electrical contact surface. An end plug 48, made of electrically insulating material, such as a polymeric or thermoplastic material, is provided at each end of the section 14. The end plugs 48 are pressed into the enclosure 18 and fit tightly around the conductors 22 and within the enclosure 18, thereby sealing the enclosure 18. One or more support members 50, also made of an electrically insulating material, such as a polymeric or thermoplastic material, can be positioned at spaced apart intervals inside the enclosure 18 to support and maintain the physical and, more importantly, the electrical spacing of the conductors 22 inside the enclosure 18. The support members 50 fit snugly around the conductors 22 and easily slide inside the enclosure 18. Referring to FIG. 3, each support member 50 is generally cylindrical in shape and has a first end 54 and a second end 58. A number of passageways 62 run longitudinally through the support member 50 connecting the first end 54 with the second end 58. These passageways are dimensioned to tightly receive the electrical conductors 22.

Means for connecting adjacent sections, such as 14 and 14' shown in FIG. 1, at one of their ends is provided. For example, referring to FIG. 4, one embodiment of the joint connecting member 26 is illustrated which serves this function. The joint connecting member 26 has a first end 66 and a second end 70. A plurality of stepped passageways 74 extend longitudinally through the joint connecting member 26 for communication between the first end 66 and the second end 70. Each stepped passageway 74 has an inlet portion 78 extending inward from the first end 66 and the second end 70 and a connecting portion 82 which connects the inlet portions 78. The inlet portions 78 have a larger diameter than the connecting portion 82 providing a beveled step 86 at their intersection.

Figure 4:
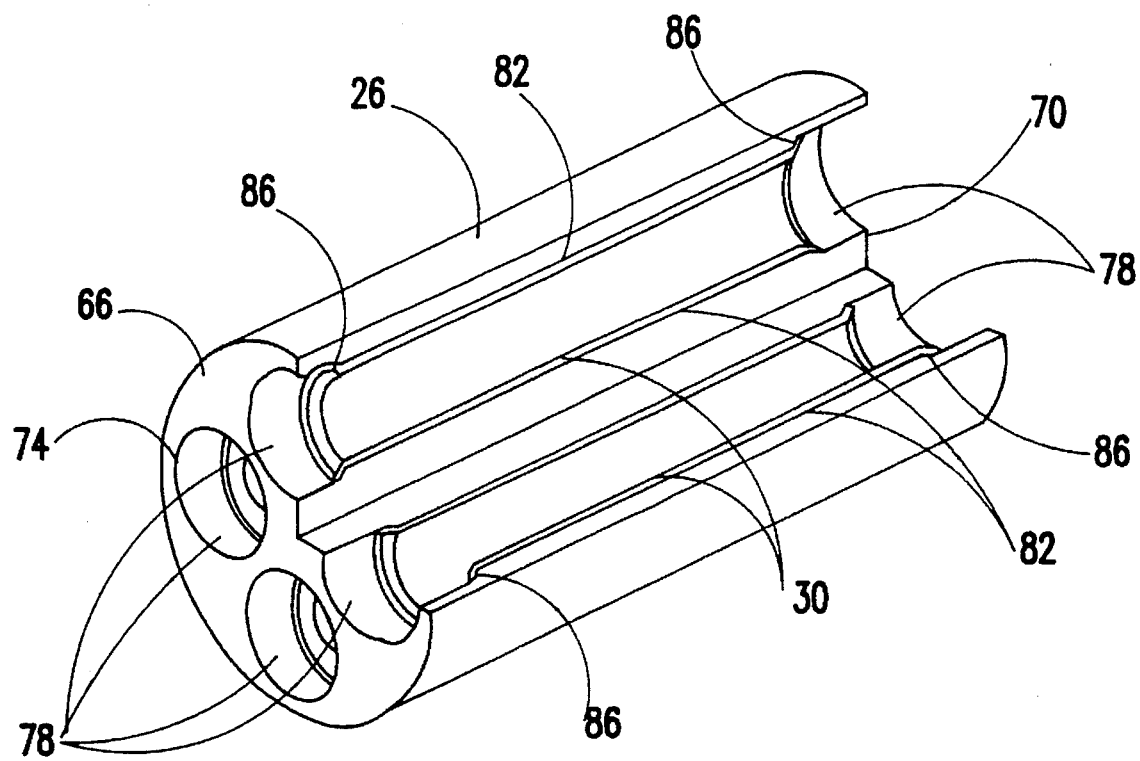
FIG. 4 is a partial cross section view of a joint connecting member for connecting two adjoining sections of pre-bussed rigid conduit constructed in accordance with the present invention.
Figure 5:
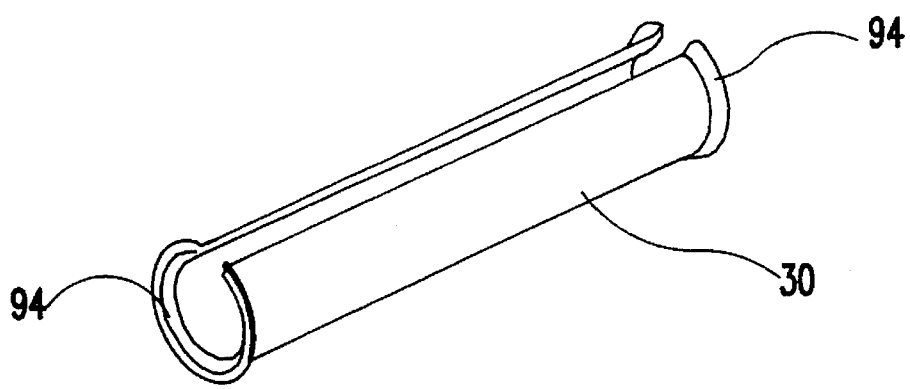
FIG. 5 is an isometric view of an electrical connector, normally disposed within the joint connecting member illustrated in FIG. 4, for facilitating electrical contact between corresponding conductors of two adjacent sections of pre-bussed rigid conduit constructed in accordance with the present.

Referring to FIG. 5, a tubular connector 30, having a C-shaped cross section, is dimensioned to be received within the connecting portion 82 of the stepped passageway 74 of the joint connecting member 26 shown in FIG. 4. Means for resisting longitudinal movement of the connector 30 within the passageways 74 of the joint connecting member 26 is provided by the ends 94 of the connector 30 being flared outward to engage the beveled step 86 of the stepped passageway 74. The flared ends 94 also facilitate insertion of the conductors 22 into the connectors 30.

Figure 9:
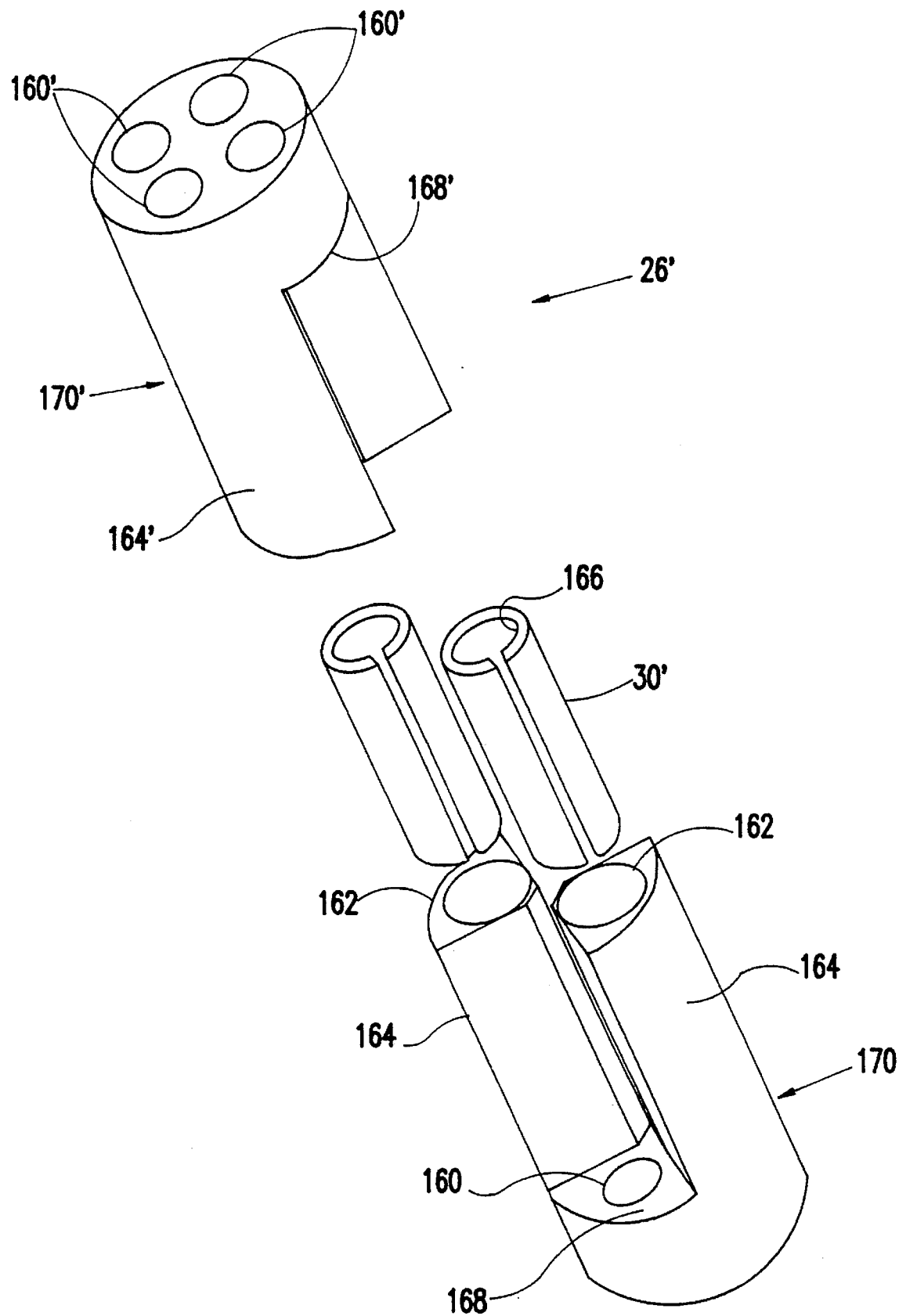
FIG. 9 is an exploded view of a joint connecting member constructed in accordance with one embodiment of the present invention.
Figure 10:
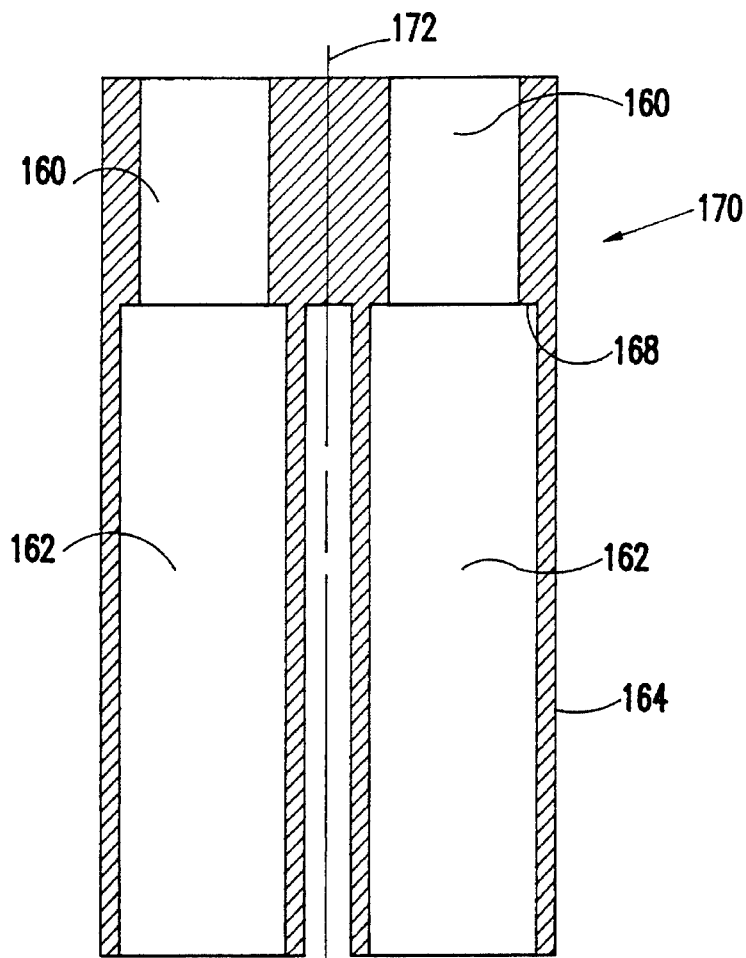
FIG. 10 is a cross-sectional view of one section of the joint connecting member illustrated in FIG. 9.
Figure 11:
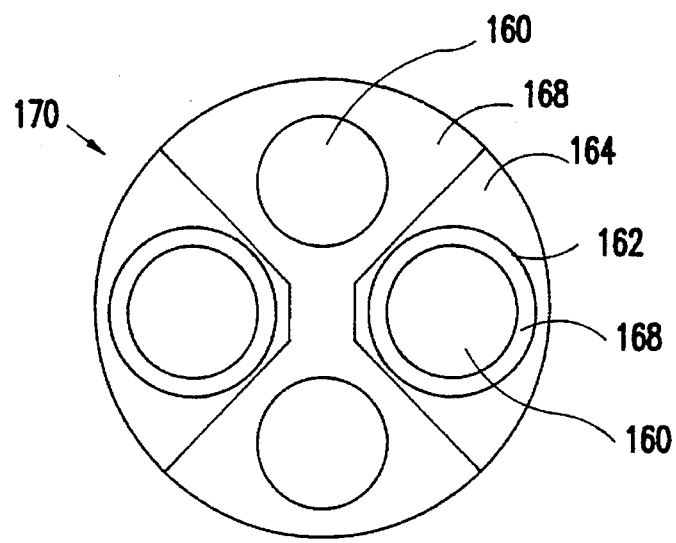
FIG. 11 is an end view of one section of the joint connecting member illustrated in FIG. 9.

Referring to FIGS. 9–11, an alternate embodiment 26' of a joint connecting member for connecting two adjacent sections 14 and 14' as shown in FIG. 1, is illustrated. The joint connecting member 26' includes first and second substantially identical sections, 170 and 170' respectively, which interlock together to form a substantially cylindrical member. The first section 170 is provided with four passageways 160 for closely but slidably receiving the conductors 22 shown in FIG. 1. The first section 170 further includes a pair of substantially wedgeshaped, i.e. quarter-cylindrical, extensions 164, each having a substantially cylindrical passageway 162, which is concentric with one of the passageways 160, extending therethrough. The passageways 162 are dimensioned for tightly receiving a substantially cylindrical electrical connecter 30' having a C-shaped cross-section and an inner surface 166 which is dimensioned for tightly receiving the stripped end 46, as shown in FIG. 2, of one of the conductors 22. The C-shaped cross-section of the connector 30' permits it to be compressed slightly for pressing into the passageway 162 when the joint connecting member 26 is assembled and to expand slightly, pressing it tightly against the wall of the passageway 162 when the stripped end 46 of a conductor 22 is inserted into it when two sections 14 and 14' are joined together, as indicated in FIG. 1. The connector 30' is similar to the connector 30 shown in FIG. 5 and serves the same purpose except that it does not include the flare-shaped ends 94 of the connector 30. The connectors 30' are dimensioned (lengthwise) to be completely received within the corresponding passageway 162. It will be appreciated that the outer diameter of the connector 30' is greater than the diameter of the passageways 160. Accordingly, when the substantially identical first and second sections 170 and 170' are assembled together, with the connectors 30' installed in the corresponding passageways 162 and 162', to form the joint connecting member 26', longitudinal displacement of the connectors 30' will be substantially prevented by the surfaces 168 and 168' of the sections 170 and 170' respectively, which are perpendicular to the longitudinal (cylindrical) axis 172 of the member 26'. It will be appreciated by those skilled in the art that appropriate means, not shown in the drawing figures, for securing the first and second sections 170 and 170' together to form the member 26', such as an adhesive, will be provided.

Figure 6:
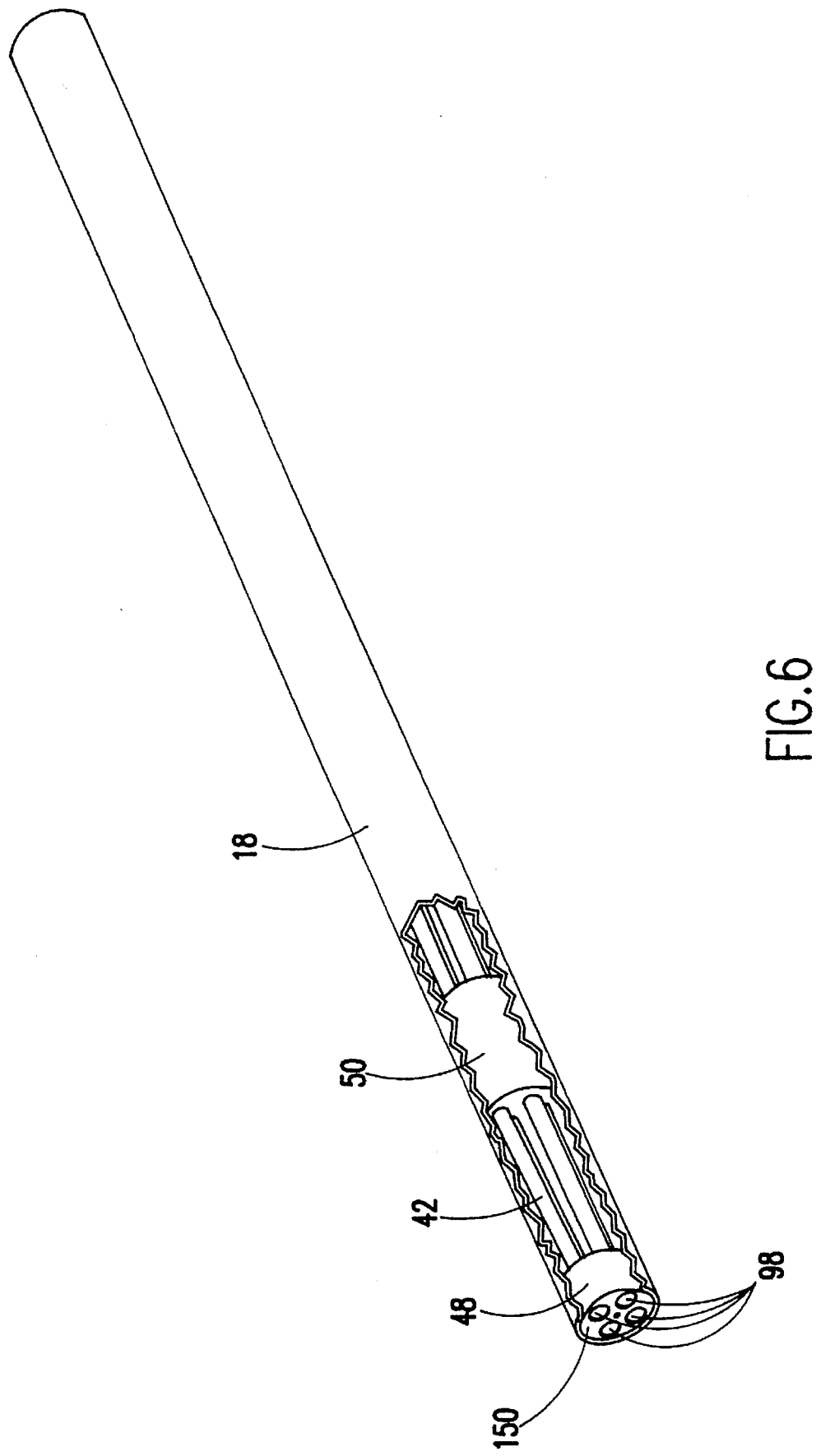
FIG. 6 is an isometric view of an alternate construction of the pre-bussed conduit of the present invention in which the electrical conductors are hollow.

One section of an alternate embodiment of the pre-bussed rigid conduit of the present invention wherein the electrical conductors 98 are tubular is shown in FIG. 6. The enclosure 18, conductor sheaths 42, end plugs 48, and support members 50 are the same as in the preferred embodiment shown in FIG. 2.

Figure 7:
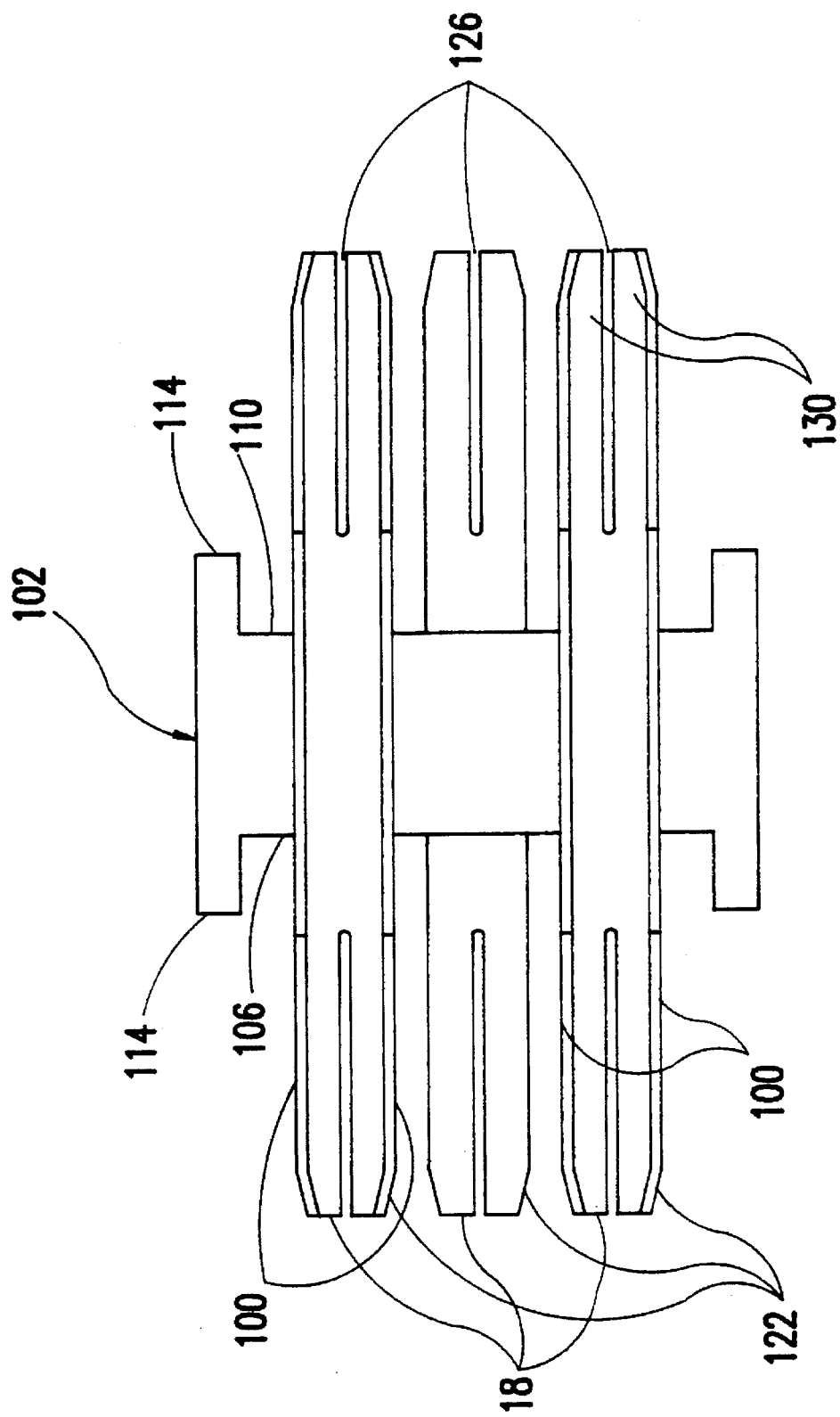
FIG. 7 is a cross sectional view of a joint connecting member for connecting two adjoining sections of pre-bussed rigid conduit constructed in accordance with the alternate construction of the present invention shown in FIG. 6, i.e. in which the electrical conductors are hollow.

FIG. 7 shows one embodiment of a joint connecting member 102 for joining two adjacent sections of pre-bussed rigid conduit of the embodiment of the present invention illustrated in FIG. 6. The joint connecting member 102 is cylindrical in shape and molded from an electrically insulating material, such as a polymeric or thermoplastic material, and has a first end 106 and a second end 110. An outer ring 114 extends outwardly from both the first and second ends, 106 and 110, respectively. The outer rings 114 slide over the outside of the enclosure 18. A number of electrical connectors 118, generally cylindrical in shape, are molded into the joint connecting member 102. Each connector 118 extends outwardly from both ends 106 and 110 respectively of the joint connecting member 102. Each connector 118 has a beveled end 122 for easier insertion of the connector 118 into the end of the tubular conductor 98. A smooth electrical contact surface 100 engages the inside of the tubular conductors 98. Each beveled end 122 has two slots 126, one perpendicular to the other, which run longitudinally inward from the beveled end 122. The longitudinal slots 126 divide the beveled end 122 into quarters 130. The longitudinal slots 126 permit the beveled end 122 to compress slightly when the connector 118 is inserted into a corresponding tubular conductor 98.

Figure 8:
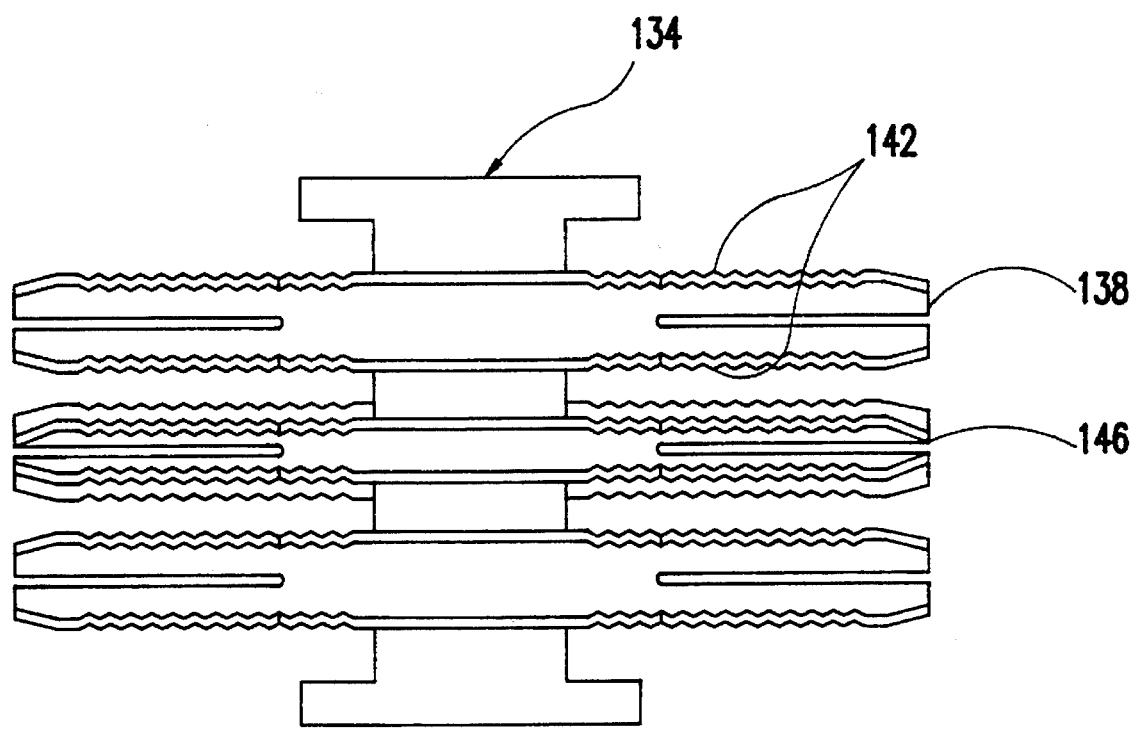
FIG. 8 is a cross sectional view of an alternate construction for a joint connecting member for connecting two adjoining sections of pre-bussed rigid conduit constructed in accordance with the alternate construction of the present invention shown in FIG. 6, i.e. in which the electrical conductors are hollow.

An alternate embodiment of joint connecting member 102' is shown in FIG. 8. The alternate joint connecting member 102' is similar in every respect to the joint connecting member 102 shown in FIG. 7 except that the connecters 118' have a ridged surface 142. Also shown in FIG. 8 is a ground connector 146 which is used when an internal ground conductor 150 is employed. When the internal ground conductor 150 is used, it is placed along the longitudinal axis of the enclosure 18 as shown in FIG. 6.

Although the present invention has been described in terms of specific embodiments, it is anticipated that alterations and modifications thereof will no doubt become apparent to those skilled in the art. For example, although the enclosures 18 of the preferred embodiment have been described as being similar to metallic electrical conduit, and in such embodiment the enclosure could be connected to ground and used as a neutral conductor, it will be understood that the enclosures 18 could be made of a nonconductive material and a neutral conductor, such as that indicated by the reference numeral 150 in FIG. 6 could be employed.

Figure 12:
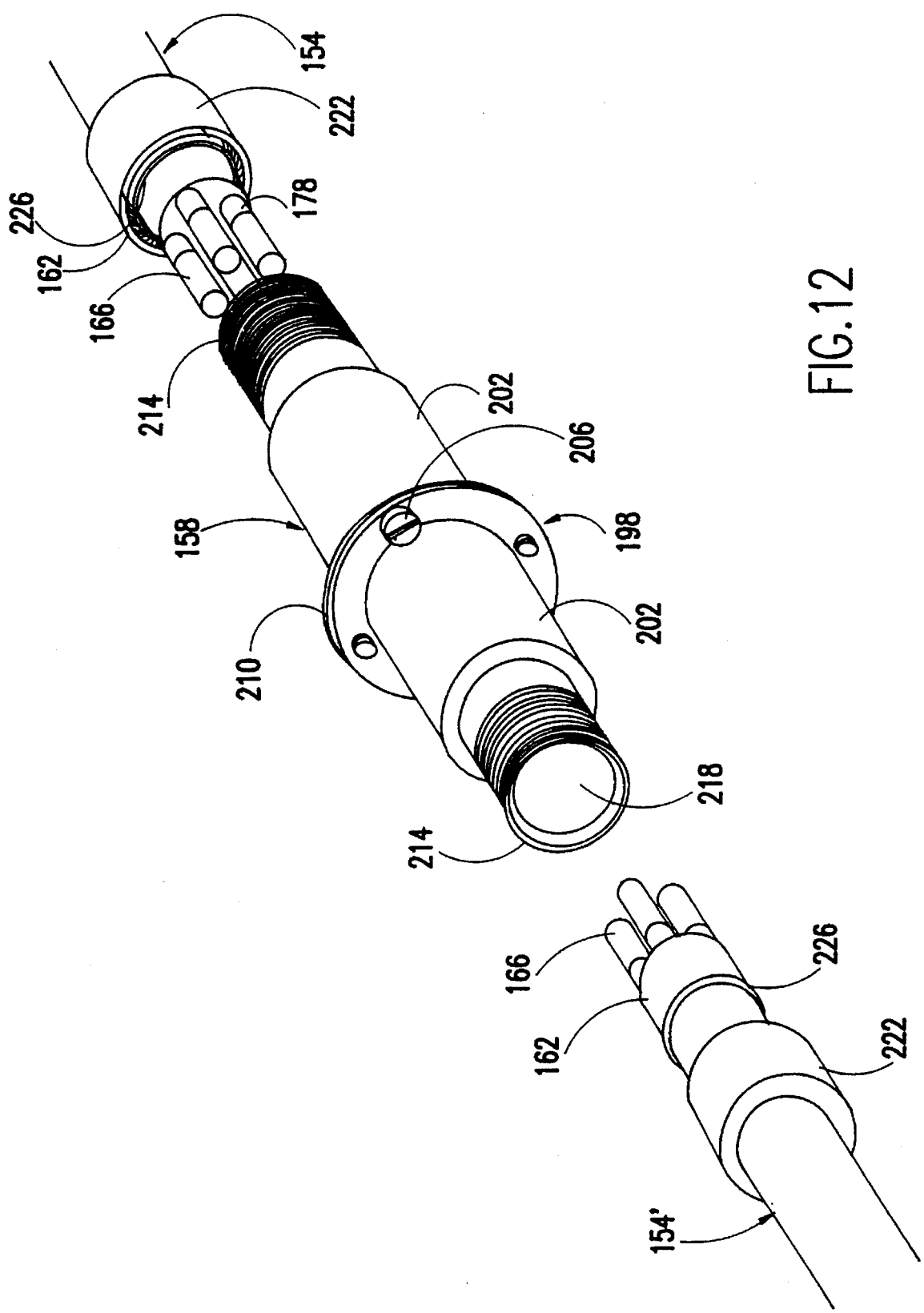
FIG. 12 is an isometric view of two sections of pre-bussed rigid conduit of the present invention as described in the third embodiment.
Figure 13:
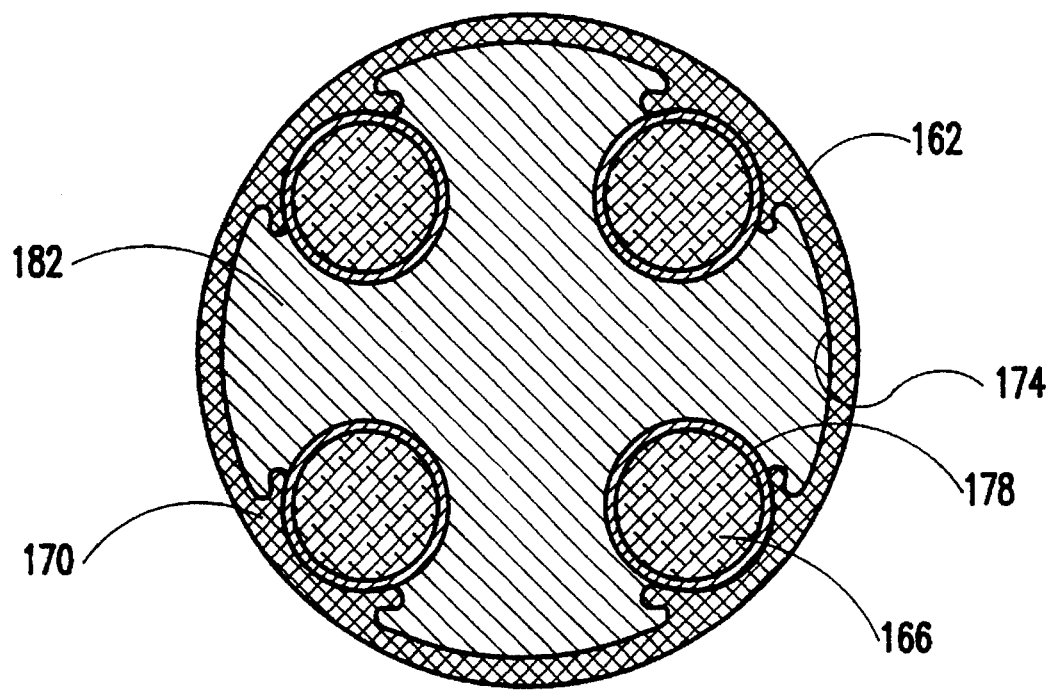
FIG. 13 is a cross-sectional view taken along lines 13—13 of FIG. 12 of a section of pre-bussed rigid conduit enclosure having pockets for receiving the electrical conductors and a foam conductor support means.
Figure 14:
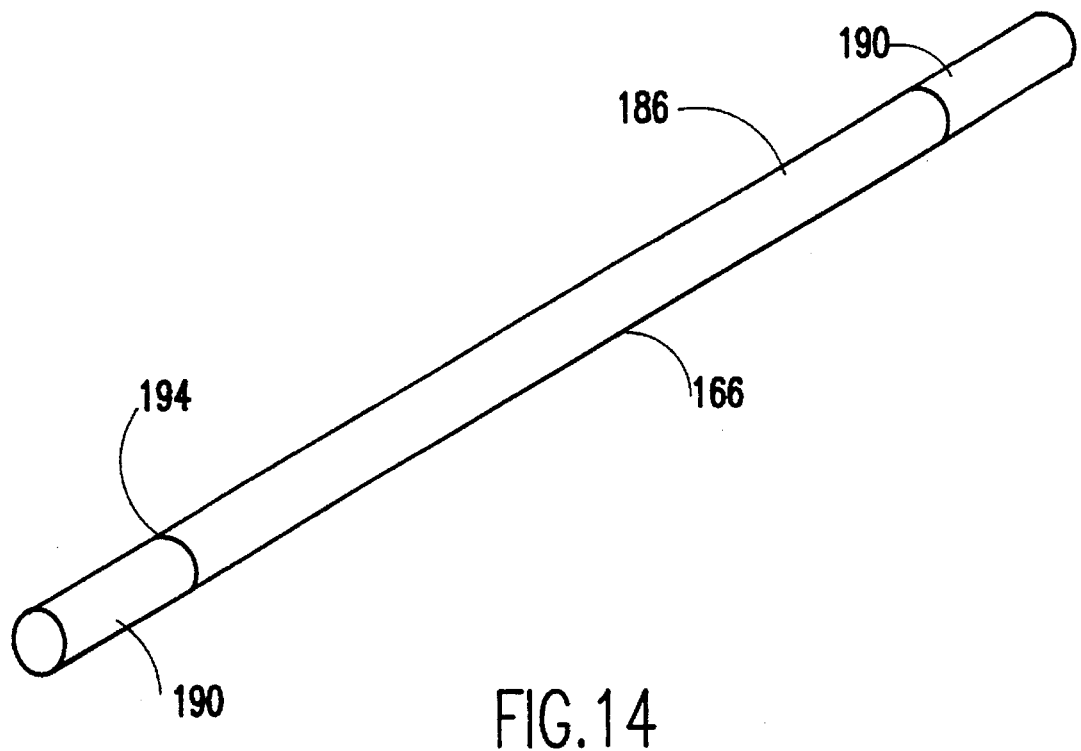
FIG. 14 is an isometric of a pre-bussed rigid conduit conductor without the insulating sleeve.

FIG. 12 illustrates a third embodiment of pre-bussed rigid conduit of the present invention. Here, pre-bussed sections (shown in FIG. 12) that are not field alterable as to length, are used in combination with pre-bussed sections (shown in FIGS. 16 and 17) that are field alterable. In FIG. 12 a first and second section 154 and 154' respectively of pre-bussed rigid conduit and their joint connecting member 158 are shown. In this embodiment the tubular enclosure 162 is extruded from an electrically conductive material and encloses a plurality of electrical conductors 166. The housing 162 is provided with four semicircular pockets 170, as shown in FIG. 13. Each pocket 170 is integrally formed from an inside surface 174 of the tubular enclosure 162 and each is equally spaced apart one from the other along the inside surface 174. The pockets 170 extend into the void defined by the inside surface 174 of the enclosure 162 and receive the electrical conductors 166. The pockets 170 provide an improved heat sink for dissipating heat produced by current flowing in the conductors 166. Each conductor 166 is enclosed in an electrically insulated sheath 178 which snugly surrounds the conductor 166 and electrically insulates the conductors 166 from one another and from the enclosure 162. The conductors 166 are supported and held in close contact with the pockets 170 along the entire length of the enclosure 162 by an expanded closed cell foam support 182 which is foamed in place after the conductors 166 are installed in the enclosure 12 and thereby completely fills the void within the enclosure 162. The foam support 182 also restrains the conductors 166 within the enclosure 162 by bonding with both the inside surface 174 of the enclosure 162 and the insulating sheath 178 surrounding the conductors 166. Each conductor 166 is made from three parts, an aluminum conductor 186 having high electrical conductivity properties and two copper contact pieces 190 as shown in FIG. 14. Each aluminum conductor 186 has one copper contact piece 190 attached to each end by a friction welding process. The copper contact piece 190 has a diameter generally equal to that of the aluminum conductor 186. During the welding process a small burr 194 is formed around the conductor 166 at the point where the aluminum conductor 186 and copper contact pieces 190 are joined. This burr 194 must be removed prior to installing the insulating sheath 178 on the conductor 166. The conductors 166 are of sufficient length that the copper contact pieces 190 extend out past each end of the tubular enclosure 162 a predetermined length.

Figure 15:
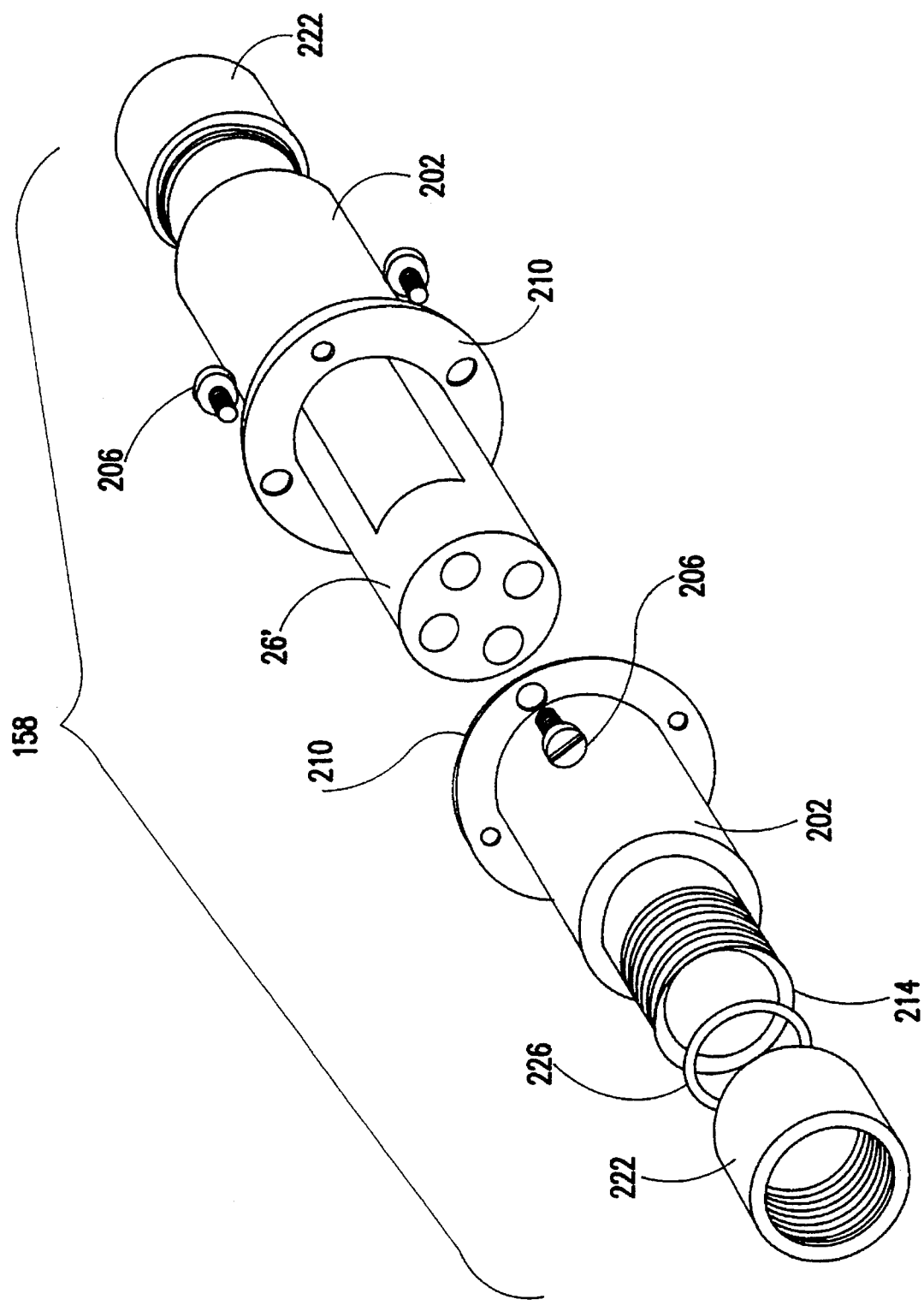
FIG. 15 is an exploded isometric view of a joint connector housing.

As shown in FIGS. 12 and 15, a joint connecting member 26' as previously described and shown in FIGS. 9–11 is used in the joint connecting member 158 to electrically connect two adjoining sections 154 and 154' of pre-bussed rigid conduit. A housing 198 consisting of two identical halves 202 connected together by means such as screws 206 encloses the joint connecting member 26'. Each housing half 202 is generally cylindrical in shape and includes a flanged end 210, a threaded end 214, and a stepped passage 218 connecting the flanged end 210 and threaded end 214. The stepped passage is sized such that the opening at the flanged end 210 will snugly receive the joint connecting member 26'.

The joint connecting member 26' is received within the two flanged ends 210 of the housing halves 202 and held in place by the stepped passage 218. The threaded ends 214 receive compression nuts 222 and compression washers 226 of the type commonly used to connect adjoining sections of electrical metallic tubing.

Figure 16:
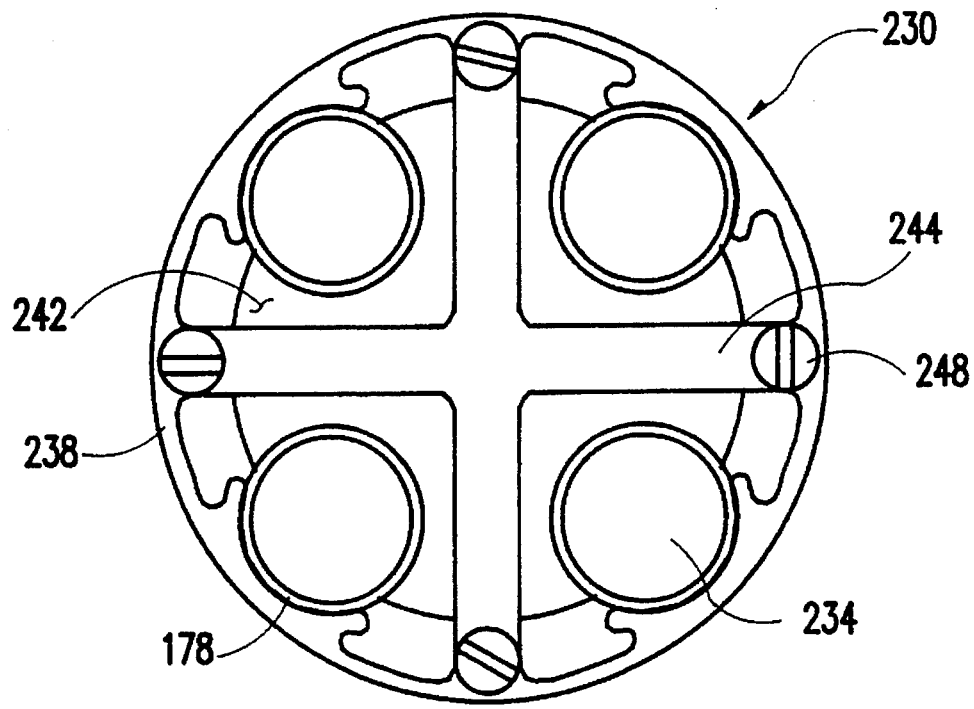
FIG. 16 is an end view of a field alterable cut-off section.
Figure 17:
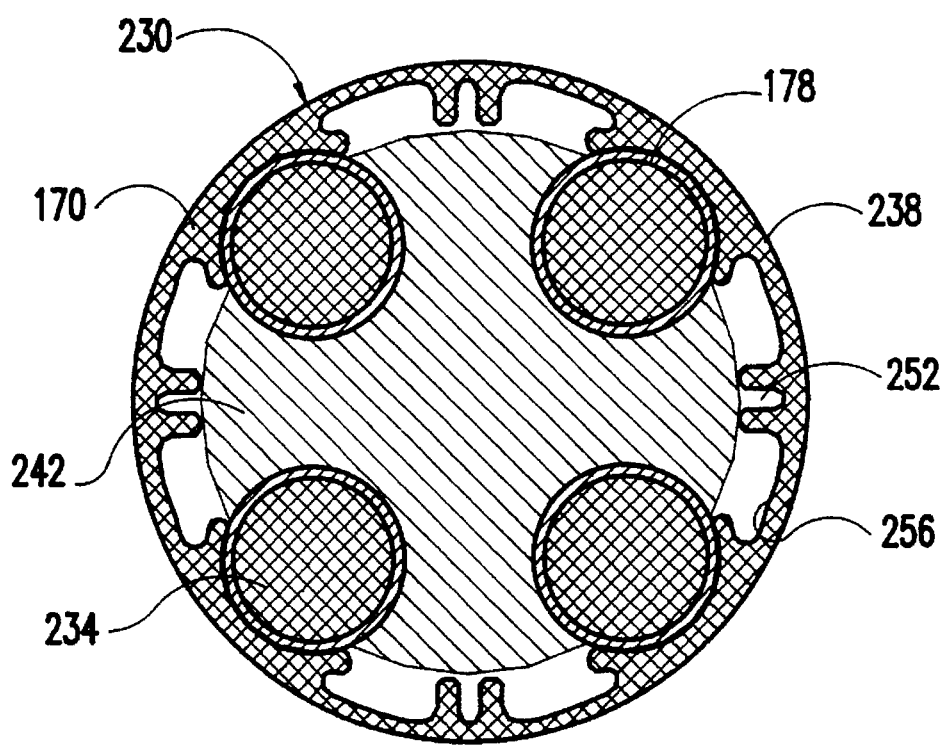
FIG. 17 is a cross-sectional view of a pre-bussed rigid conduit cut-off section of the present invention as described in the third embodiment.

Referring now to FIGS. 16 and 17, since conductors 166 extend past the ends of the enclosure 162 in this embodiment of the invention, a field alterable section 230 is provided to allow field alteration of the length of the pre-bussed conduit run. The field alterable section 230 construction is similar to that of the sections 154/154' shown in FIGS. 12 and 13 and described above. However the cut-off fitting 230 conductors 234 are slidably movable within the cutoff fitting housing 238. In order to permit the conductors 234 to be slidably movable within the housing 238 a preformed expanded closed cell foam conductor support 242 is used to support and hold the conductors 234 in place instead of the foamed in place conductor support 182 of the sections 154/154'. FIG. 16 is an end view of a cut-off fitting 230 showing an X-shaped retainer 244 which is fastened to the each end of the enclosure 238 by screws 248 and prevents the preformed conductor support 242 and the conductors 234 from sliding out of the enclosure 238. FIG. 17 is a cross-sectional view of the cut-off fitting 230 without a retainer 244. The tubular enclosure 238 of the cut-off fitting 230 is similar to that of the straight section enclosure 162 shown in FIG. 12, but also includes four generally U-shaped slots 252. Each slot 252 is integrally formed from the inside surface 256 of the enclosure 238 and extends into the void defined by the inside surface 256 of the enclosure 238. Each slot 252 is equally spaced between two pockets 170 such that it may receive one of the screws 248 holding the X-shaped retainer 244 in place at the end of the enclosure 238. The cut-off fitting conductors 234 are copper for their entire length such that a copper contact surface is available at any point along the conductor 234. Each conductor 234 is also enclosed in an electrically insulating sheath 178 which snugly surrounds the conductor 234 and electrically insulates it from other conductors 234 and the enclosure 238.

To field alter the length of a cut-off fitting 230 the first step is to remove the X-shaped retainers 244 from both ends of the enclosure 238. The conductors 234 may then be pushed out of one end of the enclosure 238 until the ends of the conductors 234 are flush with the other end of the enclosure 238. The desired enclosure length is then measured from the end of the enclosure 238 from which the conductors 234 are extending. The enclosure 238 is then marked at the desired length and cut off squarely with a hack saw or other suitable means. The preformed conductor support 242 and conductors 234 are also cut off simultaneously during this operation. Any burrs or sharp edges on the cut end of the enclosure 234 which could possibly cut or damage the insulating sheath 178 covering the conductors 238 must be removed. The conductors 234 are then pushed back into the enclosure 238 such that an equal amount of each conductor 234 extends outward past each end of the cut-off fitting enclosure 238. Any burrs on the cut end of the conductors 234 are removed and the insulating sheath 178 is stripped away from a portion of the cut end of each conductor 234 to expose an electrical contact surface. The X-shaped retainers 244 are reattached to the ends of the enclosure 234 to retain the preformed conductor support 242 and conductors 234 in place within the enclosure 238.

Figure 18:
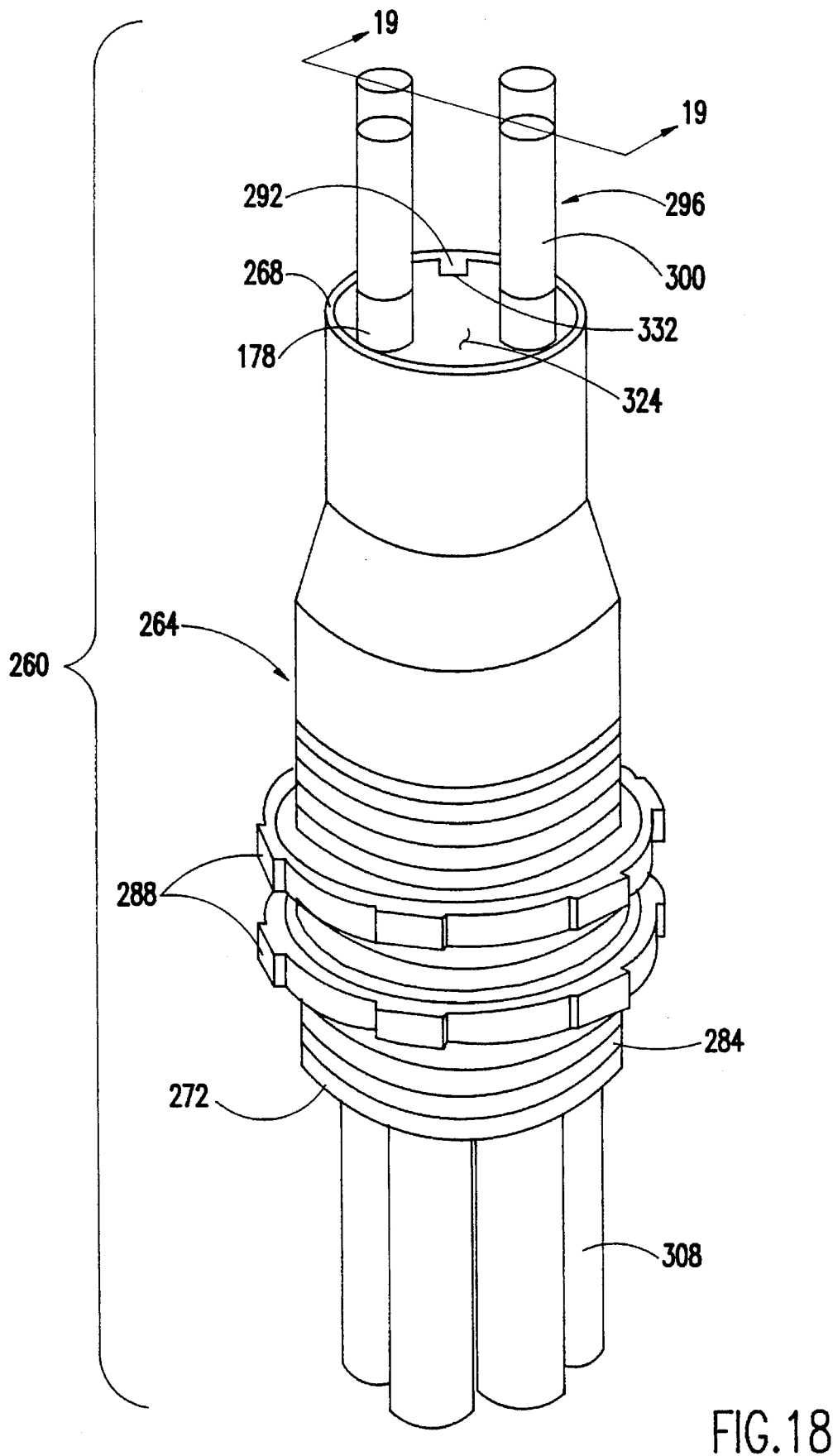
FIG. 18 is an isometric view of an end feed unit.
Figure 19:
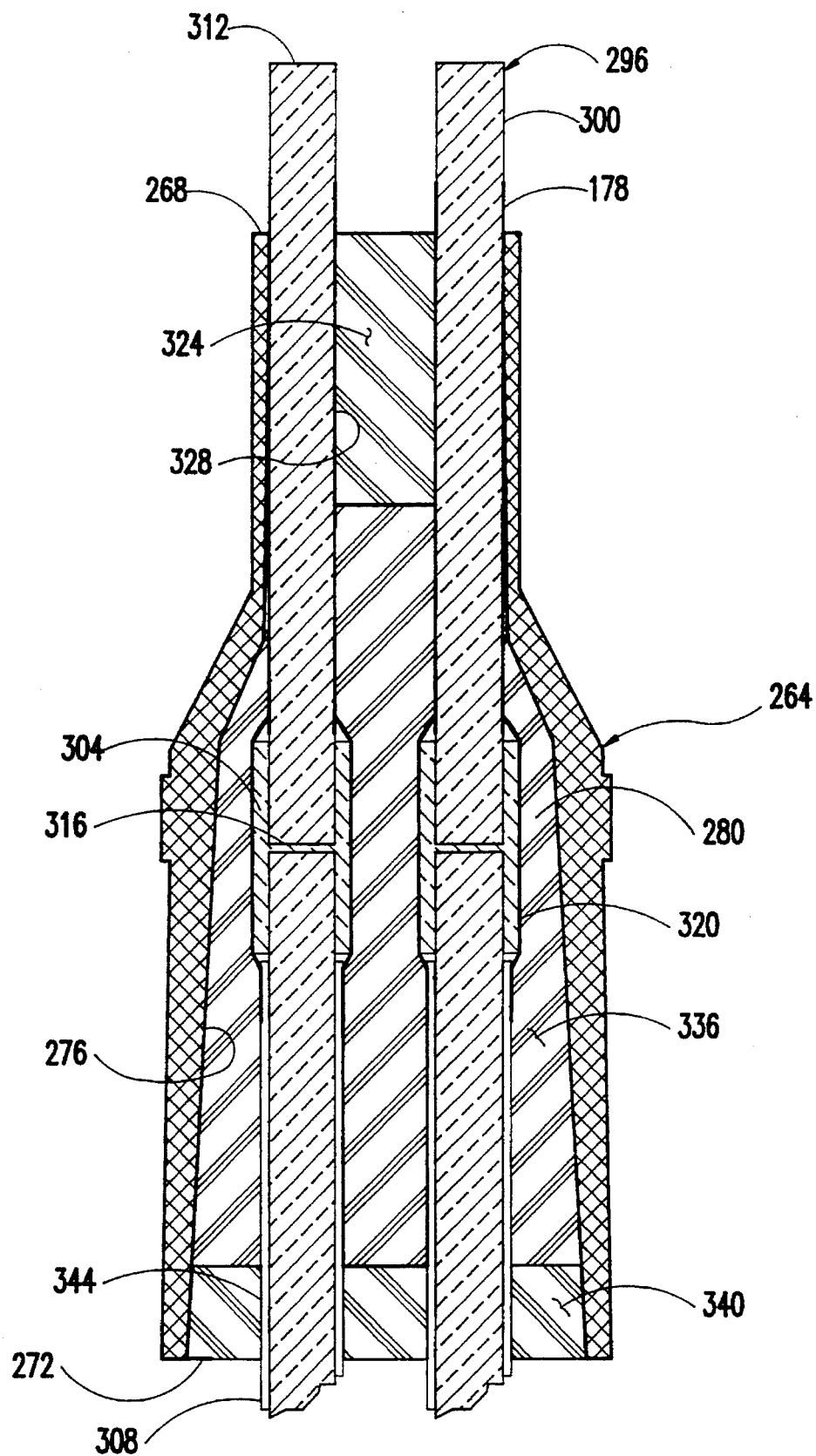
FIG. 19 is a cross-sectional view taken along lines 19—19 of FIG. 18 of an end feed unit.
Figure 20:
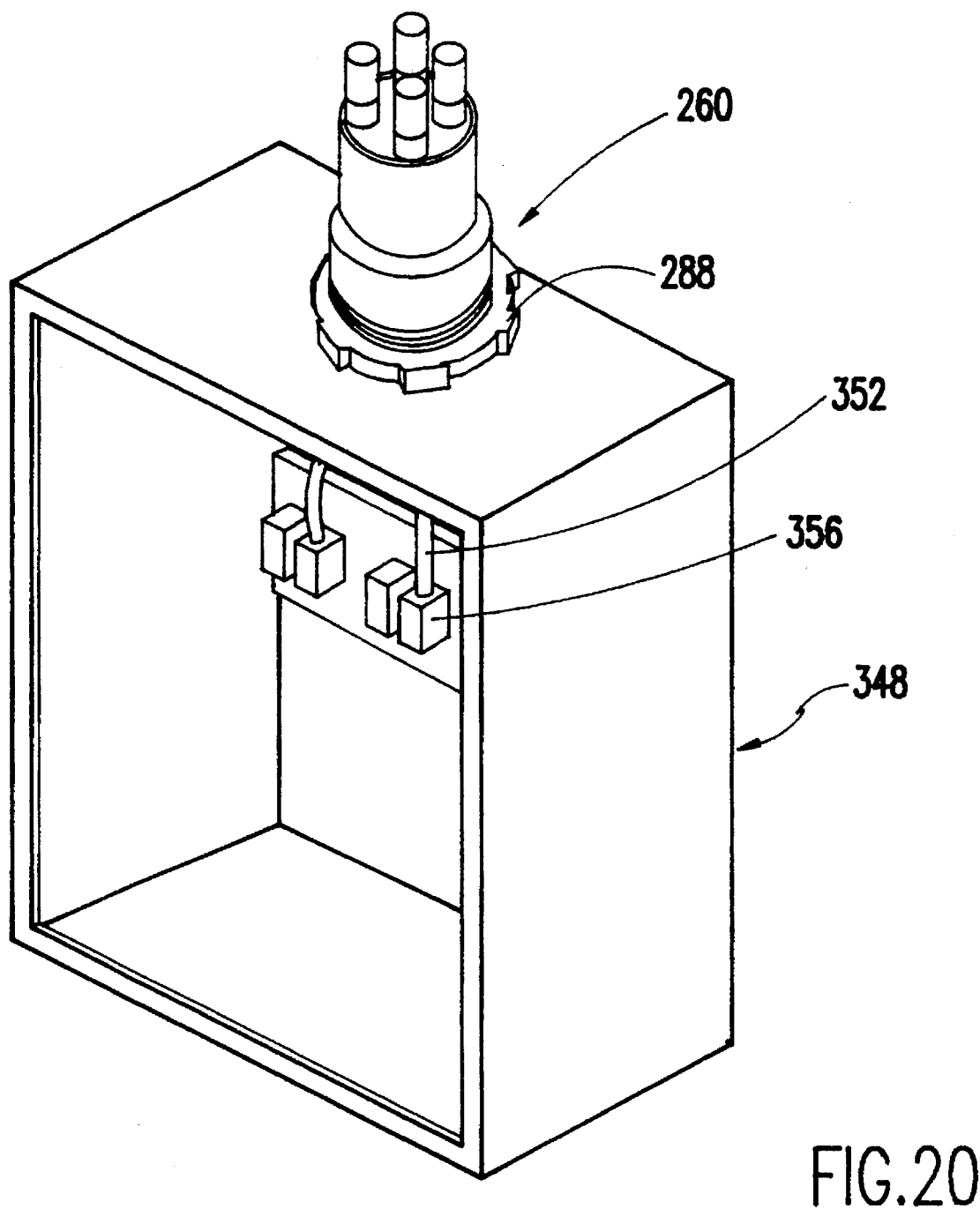
FIG. 20 is an isometric view of an end feed unit installed on a wiring enclosure.

An end feed unit generally indicated by reference numeral 260 as shown in FIG. 18 is provided for connecting the pre-bussed rigid conduit feeder system of the present invention to a power source or for providing a power tap-off point. The end feed unit 260 includes a generally cylindrical housing 264 which has a first end 268 of the same diameter as the pre-bussed rigid conduit enclosure 162, a second end 272 having a larger diameter, and a generally cylindrical stepped passage 276 connecting the first and second ends 268 and 272 respectively. The larger diameter of the passage 276 at the second end 272 is of sufficient size to form a terminal connection area 280. The second end 272 also has an externally threaded portion 284 for receiving one or more nuts 288. At the first end 268 a rib 292 running along the longitudinal axis of the housing 264 extends into the passage 276. A plurality of electrical conductor assemblies 296 each having a rigid electrical conductor 300, a butt splice compression connector 304, and an insulated flexible electrical conductor 308 of sufficient length for making electrical connections within a panelboard or other enclosed wiring space are partially enclosed within the housing. The rigid electrical conductors 300 are enclosed in an electrically insulating sheath 178 and have a first end 312 and a second end 316. A portion of the insulating sheath 178 is removed at each of the first and second ends 312 and 316 respectively to provide an electrical contact surface. The second ends 316 of the rigid conductor 300 are crimped in one end of the butt splice compression connectors 304. A portion of insulation is removed from one end of each of the flexible conductors 308 providing a contact area that is crimped in the other end of one of the butt splice compression connectors 304. A piece of heat shrinkable electrical insulation 320 is placed over the butt splice compression connector 304 and the adjacent insulation sheath 178 of the rigid conductor 300 and the insulation of the flexible conductor 308 and then heated until it shrinks tightly around the connection. A first end plug 324 sized to be snugly received within the passage at the first end 268 of the housing 264 is provided with passages 328 for snugly receiving the rigid conductors 300 and a slot 332 for receiving the rib 292 which prevents the first end plug 324 from rotating within the passage 276. After the conductor assemblies 296 are completed the first end 312 of each rigid conductor 300 is inserted into the passage 276 at the second end 272 of the housing 264 and is pushed through one of the passages 328 of the first end plug 324 until a specified length extends outward past the first end 268 of the housing 264. At this point the butt splice compression connectors 304 are enclosed in the terminal connection area 280 of the stepped passage 276. A potting material 336 is then poured into the stepped passage 276 through the second end 272 of the housing 264. The potting material 336, when cured, fixes the electrical conductor assemblies 296 within the housing 264. A second end plug 340 sized to be snugly received within the second end 272 of the stepped passage 276 is provided with passages 344 for snugly receiving the insulated flexible conductors 308 and may be installed at this time if desired. The second end 272 of the housing 264 is intended to be installed through a hole provided in a panelboard or other enclosed wiring box 348 and is attached to the panelboard by the nuts 288 as shown in FIG. 20. The free ends 352 of the flexible conductors 308 are intended to be connected to wiring terminals 356 provided within the panelboard or wiring box 348.

Figure 21:
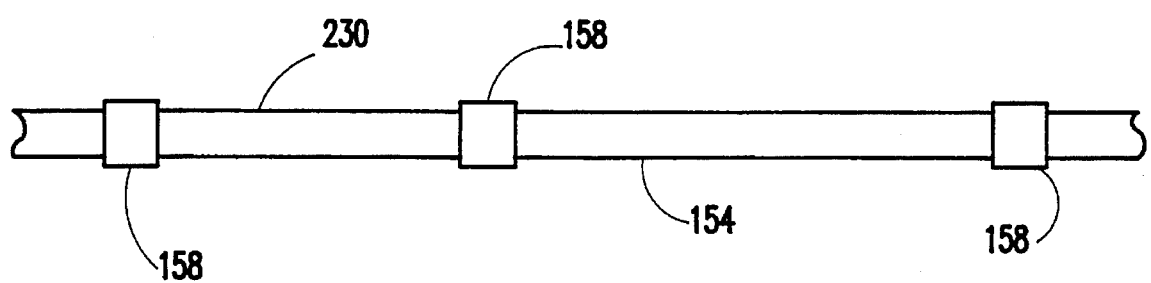
FIG. 21 is a schematic diagram of an electrical distribution feeder system comprised of field alterable and non-field alterable pre-bussed conduit sections.

Referring now to FIG. 21, it shows a segment of an electrical feeder distribution system comprised of sections 154 and described in connection with FIGS. 12-15 joined by connectors 158 to a field alterable section 230 described in connection with FIGS. 16 and 17.

It is therefore intended that the following claims be interpreted as covering all such alterations and modifications as fall within the true spirit and scope of the invention.

While the invention has been described in terms of a single preferred embodiment, those skilled in the art will recognize that the invention can be practiced with modification within the spirit and scope of the appended claims.

Having thus described my invention, what we claim as new and desire to secure by Letters Patent is as follows:

1. A section of pre-bussed conduit comprising in combination:

a substantially rigid enclosure extending along a longitudinal axis between a first end region and a second end region, said enclosure defining an inside surface having a plurality of pockets extending along said longitudinal axis between said first and second end regions;

a plurality of substantially rigid conductors within said enclosure, said plurality of rigid conductors extending from said first end region of said enclosure to said second end region of said enclosure, each said conductor being partially enclosed within an insulating sheath and being received within one of said pockets;

a support member for supporting said plurality of conductors within said enclosure in alignment with said longitudinal axis, said support member separating said plurality of conductors one from the other; and said plurality of rigid conductors forming a pattern that is uniform in cross-section along the length of said section so that said plurality of rigid conductors form a pattern of male connectors on each end of said section.

2. A section of pre-bussed conduit, field alterable by cutting the section across its length in order to join it with an additional section to form an electrical distribution feeder system, comprising in combination:

a substantially rigid enclosure extending along a longitudinal axis between a first end region and a second end region;

a plurality of substantially rigid conductors within said enclosure, said plurality of rigid conductors extending from said first end region of said enclosure to said second end region of said enclosure, each said conductor being partially enclosed within an insulating sheath;

each of said plurality of rigid conductors having a uniform cross-section along its extent;

a support member for supporting said plurality of conductors within said enclosure in alignment with said longitudinal axis, said support member separating said plurality of rigid conductors one from the other, said support member supporting said conductors so that said plurality of conductors are longitudinally movable with respect to said support member and said enclosure; and said plurality of rigid conductors forming a pattern that is uniform in cross-section along the length of said section so that said plurality of rigid conductors form a pattern of male connectors on each end of said section before and after field altering by cutting said section across its length at a desired location between said first and second end regions.

3. A section of pre-bussed conduit as in claim 2, wherein said support means includes pockets formed in said substantially rigid enclosure, sand said pockets extend along the longitudinal axis between said first end region and said second end region.

4. A section of pre-bussed conduit as in claim 2, further including a retainer means and means formed in said substantially rigid enclosure to secure said retainer means to said substantially rigid enclosure.

5. A section of pre-bussed conduit as in claim 1, wherein said substantially rigid conductors forming said pattern of male connectors on each end of said section are made of a first conductive material and said substantially rigid conductors extending between said pattern of male connectors on each end of said section are made of a second conductive material.

6. A section of pre-bussed conduit as in claim 5, wherein said first conductive material is copper and said second conductive material is aluminum.

7. A section of pre-bussed conduit as in claim 1, wherein said support member includes an expanded closed cell foam that extends the length of said section.

8. A section of pre-bussed conduit as in claim 5, wherein said closed cell foam is formed in place after said substantially rigid conductors are in place in said substantially rigid enclosure, so that said foam member bonds both with said substantially rigid enclosure and said insulating sheath enclosing said substantially rigid conductors.

9. An electrical distribution feeder system comprising in combination:

a first substantially rigid enclosure extending along a longitudinal axis between a first end region and a second end region;

a plurality of substantially rigid conductors within said first substantially rigid enclosure, said plurality of rigid conductors extending from said first end region of said enclosure to said second end region of said enclosure;

a support member for supporting said plurality of conductors within said first substantially rigid enclosure in alignment with said longitudinal axis, said support member separating said plurality of rigid conductors one from the other; and said plurality of rigid conductors forming a pattern that is uniform in cross-section along the length of said first substantially rigid enclosure so that said plurality of rigid conductors form a pattern of male connectors on each end of said first substantially rigid enclosure;

a second substantially rigid enclosure extending along a longitudinal axis between a first end region and a second end region, said second substantially rigid enclosure having a uniform cross-section along its extent;

a plurality of substantially rigid conductors within said second substantially rigid enclosure, said plurality of rigid conductors extending from said first end region of said said second substantially rigid enclosure to said second end region of said second substantially rigid enclosure;

each of said plurality of rigid conductors having a uniform cross-section along its extent;

a support member for supporting said plurality of conductors within said second substantially rigid enclosure in alignment with said longitudinal axis, said support member separating said plurality of rigid conductors one from the other, said support member supporting said plurality of conductors so that said plurality of conductors are longitudinally movable with respect to said support member and said enclosure;

said plurality of rigid conductors forming a pattern that is uniform in cross-section along the length of said second substantially rigid enclosure so that said plurality of rigid conductors form a pattern of male connectors on each end of said second substantially rigid enclosure and form the same pattern of male connectors if said section is field-altered by cutting the section across its length; and a connector electrically and mechanically connecting said plurality of substantially rigid conductors in said first substantially rigid enclosure to said plurality of substantially rigid conductors in said second substantially rigid enclosure.

10. A section of pre-bussed conduit as in claim 9, wherein said substantially rigid conductors forming said pattern of male connectors on each end of said first substantially rigid enclosure are made of a first conductive material and said substantially rigid conductors extending between said pattern of male connectors on each end of said first substantially rigid enclosure are made of a second conductive material, and said substantially rigid conductors forming said pattern of male connectors on each end of said second substantially rigid enclosure are made of said first conductive material.

11. A section of pre-bussed conduit as in claim 10, wherein said first conductive material is copper and said second conductive material is aluminum.

12. A section of pre-bussed conduit as in claim 2, wherein said support member includes an expanded closed cell foam that extends the length of said section.

13. A section of pre-bussed conduit as in claim 12 wherein said support member is preformed externally of said enclosure and is dimensioned to be slidably received within said enclosure.

14. A section of pre-bussed conduit as in claim 1 wherein said pockets are integrally formed from said substantially rigid enclosure for sinking heat from said substantially rigid conductors received therein to said substantially rigid enclosure for efficient heat dissipation.

15. A pre-bussed end feed unit providing an end terminal for a sectionalized pre-bussed conduit electrical distribution feeder system, said end feed unit comprising in combination:

a substantially rigid enclosure extending along a longitudinal axis between a first end region and a second end region;

a plurality of substantially rigid conductors partially enclosed within said enclosure such that a portion of said plurality of rigid conductors extends between said first end region of said enclosure and a second region within said enclosure and a portion of said plurality of rigid conductors extend outward from said first end region forming a pattern of male connectors, said plurality of rigid conductors forming a pattern that is uniform in cross-section along the length of said section between said first end section and said second section;

a plurality of flexible electrical conductors, each being electrically and mechanically connected to one of said plurality of rigid conductors at said second region within said enclosure, said plurality of flexible conductors extending beyond said second end region of said enclosure; and a support member for supporting said plurality of rigid and said plurality of flexible conductors within said enclosure between said first and second end regions of said enclosure such that said rigid conductors and their associated flexible conductors are generally in alignment with said longitudinal axis of said enclosure and separated one from the other, means for connecting said plurality of male connectors to a section of pre-bussed conduit.

* * * * *